United States Patent
Ohta

(10) Patent No.: US 6,316,917 B1
(45) Date of Patent: Nov. 13, 2001

(54) APPARATUS HAVING PLURAL ELECTRIC DOUBLE LAYER CAPACITORS AND METHOD FOR ADJUSTING VOLTAGES OF THE CAPACITORS

(75) Inventor: Hiroshi Ohta, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/519,852

(22) Filed: Mar. 6, 2000

(30) Foreign Application Priority Data

Mar. 9, 1999 (JP) .................................................. 11-062445

(51) Int. Cl.$^7$ ...................................................... H02J 7/00
(52) U.S. Cl. .............................................................. 320/166
(58) Field of Search .................................... 320/166, 167, 320/116; 700/293

(56) References Cited

U.S. PATENT DOCUMENTS

| | | | |
|---|---|---|---|
| 5,532,572 | * 7/1996 | Okamura | 320/166 |
| 5,713,426 | 2/1998 | Okamura | 180/65.3 |
| 5,783,928 | * 7/1998 | Okamura | 320/167 |
| 5,932,932 | 8/1999 | Agatsuma et al. | 307/10.6 |
| 5,952,815 | * 7/1999 | Rouillard et al. | 320/116 |
| 5,977,748 | * 11/1999 | Okamura | 320/166 |
| 5,982,050 | 11/1999 | Matsui | 307/10.7 |
| 6,034,492 | * 3/2000 | Saito et al. | 318/141 |
| 6,104,967 | * 8/2000 | Hagen et al. | 700/293 |

FOREIGN PATENT DOCUMENTS

| | | |
|---|---|---|
| 0 564 149 | 10/1993 | (EP) . |
| 0 693 814 | 1/1996 | (EP) . |
| 10-201091 | 7/1998 | (JP) . |
| WO 99/05767 | 2/1999 | (WO) . |

* cited by examiner

*Primary Examiner*—Peter S. Wong
*Assistant Examiner*—Pia Tibbits
(74) *Attorney, Agent, or Firm*—Oblon, Spivak, McClelland, Maier & Neustadt, P.C.

(57) ABSTRACT

An electric double layer capacitor apparatus including a plurality of electric double layer capacitors connected in series, at least one set of a voltage detection device and a discharge device, and a controller. The at least one set is provided to at least one of the plurality of electric double layer capacitors. The voltage detection device is configured to detect a terminal voltage of the at least one of the plurality of electric double layer capacitors. The controller is configured to stop charging the plurality of electric double layer capacitors when the terminal voltage detected by the voltage detection device reaches a maximum charge voltage. The discharge device is configured to discharge the at least one of the plurality of electric double layer capacitors such that said terminal voltage drops toward a predetermined target voltage which is lower than the maximum charge voltage when the terminal voltage is higher than the predetermined target voltage, and the discharge device is configured not to discharge through the load the at least one of the plurality of electric double layer capacitors when the terminal voltage is equal to or lower than the predetermined target voltage.

34 Claims, 15 Drawing Sheets

APPARATUS HAVING PLURAL ELECTRIC DOUBLE LAYER CAPACITORS AND METHOD FOR ADJUSTING VOLTAGES OF THE CAPACITORS

CROSS-REFERENCE TO RELATED APPLICATIONS

The present application claims priority under 35 U.S.C. §119 to Japanese Patent Application No. 11-62445, filed Mar. 9, 1999, entitled "Electric Double Layer Capacitor Apparatus." The contents of that application are incorporated herein by reference in their entirety.

BACKGROUND OF THE INVENTION

1. Field of the Invention

The present invention relates to an electric double layer capacitor apparatus including a plurality of electric double layer capacitors and a method for adjusting voltages of the plurality of electric double layer capacitors.

2. Description of the Background

Power supplies which include a plurality of electric double layer capacitors are disclosed in U.S. Pat. No. 5,783,928 (hereinafter referred to as the "'928 patent"), entitled "Storage Capacitor Power Supply"; U.S. Pat. No. 5,982,050 (hereinafter referred to as the "'050 patent"), entitled "Power Supply Unit For Automotive Vehicle"; U.S. Pat. No. 5,932,932 (hereinafter referred to as the "'932 patent"), entitled "Storage battery voltage control apparatus"; and Japanese Unexamined Patent Publication (Kokai) 10-201091 (hereinafter referred to as the "'091 publication"), entitled "Power Supply Unit For Automotive Vehicle Utilizing Electric Double Layer Capacitors." The contents of these applications are incorporated herein by reference in their entirety.

In an electric double layer capacitor apparatus disclosed in the '928 patent, referring to FIG. 13, an electric double layer capacitor apparatus includes a plurality of electric double layer capacitors 1 (hereinafter referred to as "a cell" or "cells"). Each cell 1 has a current bypass circuit 16 which is connected to each cell 1 in parallel. An operation voltage of the shunt regulator 7 is set at a maximum charge voltage ($V_u$) of the cell 1 by adjusting a ratio of resistance of the resistors (13 and 15). When the voltage between a positive and negative pole terminals (3A and 3B) of the cell 1 is equal to the maximum charge voltage ($V_u$), the shunt regulator 7 turns on and therefore current flows to the resistor 5. Accordingly, a PNP transistor 9 turns on and prevents all capacitors from being applied with voltages exceeding maximum charge voltage. When the voltage between the positive and negative pole terminals (3A and 3B) is equal to the maximum charge voltage ($V_u$).

In FIG. 13, it is supposed that capacitance (C1) of the cell (1a) is 1000 (F), capacitance (C2) of the cell (1b) is 1150 (F) and charge current is constant at 10 (A). Further, initial voltages of the cells (1a and 1b) are equal to zero (V) and the maximum charge voltage ($V_u$) is set at 2.5 (V) and equal to a uniform voltage.

Referring to FIG. 14, the voltage of the cell (1a) which has smaller capacitance becomes the maximum charge voltage ($V_H$) at (t1) before the voltage of the cell (1b) becomes the maximum charge voltage ($V_H$). Then, the voltage of the cell (1b) becomes the maximum charge voltage ($V_H$) at (t2) which is after (t1) by ($\Delta t$). ($\Delta t$) is approximately calculated as follows:

$$\Delta t = (C2-C1)*V_H/I = 37.5 \text{ seconds.}$$

Heat of about 25 (W) generates in the bypass circuit (16) when bypass current flows for the period of $\Delta t$.

The '050 patent discloses a power supply unit which includes a plurality of electric double layer capacitors and a plurality of current bypass circuits which are connected to each cell in parallel, respectively. Each circuit has a Zener diode. The voltage of each cell is substantially adjusted to be Zener voltage.

The '091 reference discloses a power source which includes a plurality of electric double layer capacitors and a plurality of discharge circuits in order to adjust the voltage of each cell. Each discharge circuit is connected to each cell in parallel via a switch. When an accessary switch of a car is turned on, each switch connects each discharge circuit to each cell. Accordingly, the voltage of each cell is adjusted. Each switch may be manually turned on to discharge each cell after an engine stops.

The '932 reference discloses a storage battery voltage control apparatus which includes a plurality of electric double layer capacitors and a voltage-correcting storage battery over switches and a current-limiting resistor. In order to adjust the voltage of each cell, the voltages of each of the storage battery cells high in voltage can be equalized by transferring the charge to a storage battery cell low in voltage.

SUMMARY OF THE INVENTION

According to one aspect of the invention, an electric double layer capacitor apparatus includes a plurality of electric double layer capacitors connected in series, at least one set of a voltage detection device and a discharge device, and a controller. The at least one set is provided to at least one of the plurality of electric double layer capacitors. The voltage detection device is configured to detect a terminal voltage of the at least one of the plurality of electric double layer capacitors. The controller is configured to stop current for charging the plurality of electric double layer capacitors when the terminal voltage detected by the voltage detection device reaches a maximum charge voltage. The discharge device is configured to discharge the at least one of the plurality of electric double layer capacitors such that said terminal voltage drops toward a predetermined target voltage which is lower than the maximum charge voltage when the terminal voltage is higher than the predetermined target voltage, and the discharge device is configured not to discharge the at least one of the plurality of electric double layer capacitors when the terminal voltage is equal to or lower than the predetermined target voltage.

According to another aspect of the invention, a method for adjusting voltages of a plurality of electric double layer capacitors, includes charging the plurality of electric double layer capacitors which are connected in series; detecting a terminal voltage of at least one of the plurality of electric double layer capacitors; stopping charging the plurality of electric double layer capacitors when it is determined that the terminal voltage is equal to or higher than a maximum charge voltage; discharging the at least one of the plurality of electric double layer capacitors such that the terminal voltage drops toward a predetermined target voltage which is lower than the maximum charge voltage when the terminal voltage is higher than the predetermined target voltage; and preventing discharging the at least one of the plurality of electric double layer capacitors such that the terminal voltage is maintained when the terminal voltage is equal to or lower than the predetermined target voltage.

According to yet another aspect of the invention, a voltage control circuit for an electric double layer capacitor apparatus which comprises a plurality of electric double layer capacitors connected in series, includes at least one voltage detection circuit, a controlling circuit, at least one electric discharging circuit. The least one voltage detection circuit is configured to detect a terminal voltage of at least one of the plurality of electric double layer capacitors. The controlling circuit is configured to stop charging the plurality of electric double layer capacitors when it is determined that voltage of at least one of the plurality of electric double layer capacitors is equal to or higher than a maximum charge voltage based on the detected terminal voltage. The at least one electric discharging circuit is provided corresponding to the at least one voltage detection circuit. The at least one electric discharging circuit is configured to discharge electricity charged in adjustment capacitors among the plurality of electric double layer capacitors such that voltage of each of the adjustment capacitors drops toward a predetermined target voltage which is lower than the maximum charge voltage when said terminal voltage is higher than the predetermined target voltage.

According to a further aspect of the invention, a system includes a motor configured to operate the system, a plurality of electric double layer capacitors connected in series, at least one set of a voltage detection device and a discharge device, and a controller. The at least one set is provided to at least one of the plurality of electric double layer capacitors. The voltage detection device is configured to detect a terminal voltage of the at least one of the plurality of electric double layer capacitors. The controller is configured to stop current for charging the plurality of electric double layer capacitors when the terminal voltage detected by the voltage detection device reaches a maximum charge voltage. The discharge device is configured to discharge the at least one of the plurality of electric double layer capacitors such that said terminal voltage drops toward a predetermined target voltage which is lower than the maximum charge voltage when the terminal voltage is higher than the predetermined target voltage, and the discharge device is configured not to discharge the at least one of the plurality of electric double layer capacitors when the terminal voltage is equal to or lower than the predetermined target voltage.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

Figure 1:
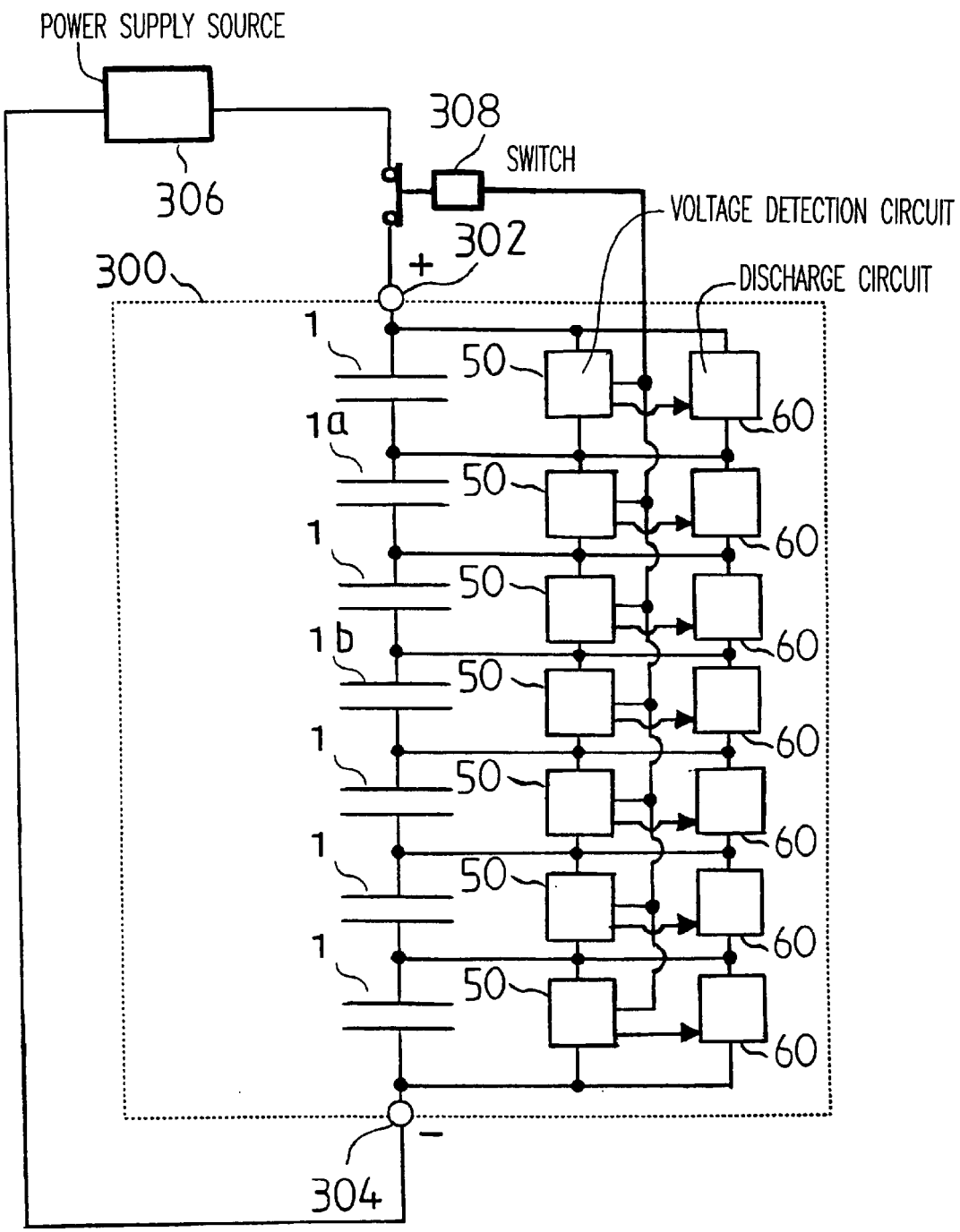
FIG. 1 is a block diagram showing an electric double layer capacitor apparatus according to an embodiment of the present invention.

The preferred embodiments will now be described with reference to the accompanying drawings, wherein like reference numerals designate corresponding or identical elements throughout the various drawings.

FIG. 1 shows an electric double layer capacitor apparatus according to an embodiment of the present invention. Referring to FIG. 1, an electric double layer capacitor apparatus 300 includes a plurality of electric double layer capacitors 1 (hereinafter referred to as "a cell" or "cells"), and a plurality sets of voltage detection circuit 50 and discharge circuit 60. The electric double layer capacitor apparatus 300 further includes positive and negative terminals (302 and 304) which are connected to a power supply source 306 via a switch 308. The power supply source 306 is a current supply source, preferably constant current source to the electric double layer capacitor apparatus 300 in order to charge the cells 1. The power supply source 306 may supply current which is adjustable or changeable as time elapses. Also the power supply source 306 is preferably to be a constant current source. Each voltage detection circuit 50 is connected to positive and negative ends of each of all cells 1 and detects voltage of each cell 1. When voltage of any one of the cells 1 detected by a voltage detection circuit 50 is equal to or higher than a predetermined maximum charge voltage ($V_u$) of the cells 1, the voltage detection circuit 50 operates to open the switch 308. Accordingly, the power supply source 306 stops supplying electric power to the electric double layer capacitor apparatus 300.

Each discharge circuit 60 is connected to the positive and negative ends of each of all cells 1. When voltage of a cell 1 detected by a voltage detection circuit 50 is equal to or lower than an equalized voltage ($V_e$) which is lower than the maximum charge voltage ($V_u$), the discharge circuit 60 of that cell 1 is off and thus the cell 1 is not discharged through the discharge circuit 60. When voltage of a cell 1 detected by a voltage detection circuit 50 is higher than the equalized voltage ($V_e$), the discharge circuit 60 of that cell 1 turns on and thus the cell 1 is discharged through the discharge circuit 60 such that the voltage of the cell 1 becomes substantially equal to the equalized voltage ($V_e$). Accordingly, only cells 1 (voltage adjustment capacitors) whose voltages are higher than the equalized voltage ($V_e$) are discharged via the discharge circuits 60, respectively, to equalize voltages of the plurality of cells 1 at the equalized voltage ($V_e$). Accordingly, in this case, the equalized voltage ($V_e$) is a predetermined target voltage. When voltage of a cell 1 detected by a voltage detection circuit 50 is equal to or lower than the equalized voltage ($V_e$) during discharging, the discharge circuit 60 is off and thus the discharge of the cell 1 stops. Therefore, voltages of each cell 1 become equal to the equalized voltage ($V_e$).

In this embodiment, when voltage of a cell 1 is higher than the equalized voltage ($V_e$), the discharge circuit 60 of that cell 1 turns on and thus the cell 1 is discharged even though during the charging period. However, the discharge circuit 60 may be off during the charging period even though voltage of a call 1 is higher than the equalized voltage ($V_e$) and may turn on after the charging period is complete and when voltage of a cell 1 is higher than the equalized voltage ($V_e$)

Further, the maximum charge voltage ($V_u$) and the equalized voltage ($V_e$) may be semi-fixed values or automatically changeable values according to environments or applications.

Figure 2:
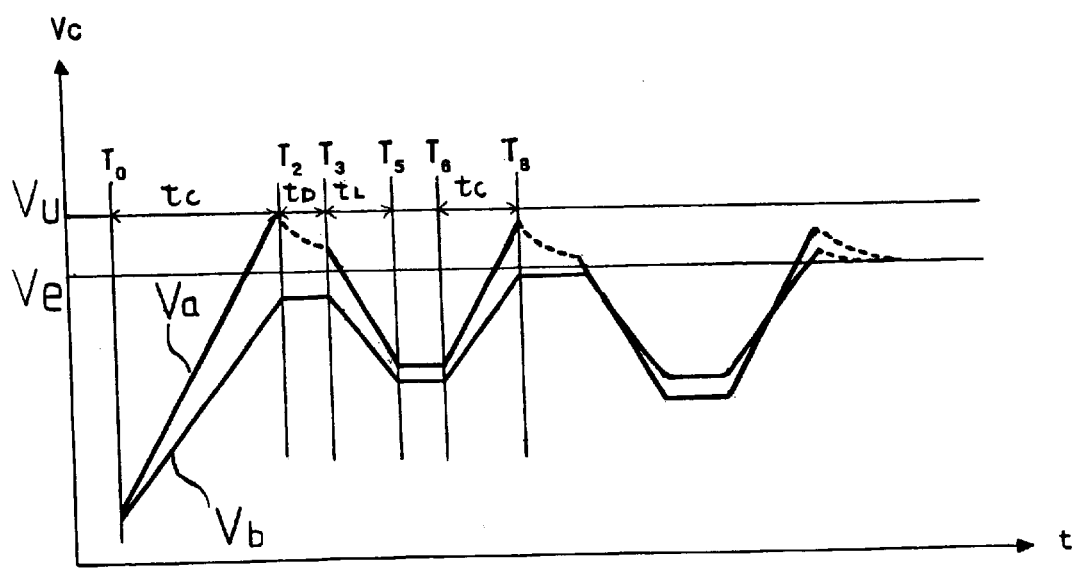
FIG. 2 is a graph showing changes of voltages ($V_a$ and $V_b$) of cells of the electric double layer capacitor apparatus shown in FIG. 1.

FIG. 2 illustrates change of voltages ($V_a$ and $V_b$) of cells 1, for example, cells (1a and 1b). All cells 1 are not necessarily charged to have voltages higher than the equalized voltage ($V_e$). Referring to FIGS. 1 and 2, both cells (1a and 1b) are charged during a charge period ($t_c$) from ($T_0$) to ($T_2$). At ($T_2$), the voltage ($V_a$) of the cell (1a) becomes equal to the maximum charge voltage ($V_u$). Accordingly, at ($T_2$), the voltage detection circuit 50 operates to open the switch 308 and the power supply source 306 stops supplying current the electric double layer capacitor apparatus 300. When current stops, the voltage ($V_a$) of the cell (1a) drops by dropping voltage ($V_{drop}$), because the cell 1 has internal resistance ($R_{in}$) which is normally in the range of (mΩ). The dropping voltage ($V_{drop}$) is calculated as follows:

$$V_{drop} = R_{in} * Ic, \text{ where}$$

Ic is charge current.

At ($T_2$), since the voltage ($V_a$) of the cell (1a) is higher than the equalized voltage ($v_e$), the discharge circuit 60 of the cell (1a) turns on and thus the cell (1a) is discharged through the discharge circuit 60. The cell (1a) is a discharge capacitor. The cell (1a) is discharged during a discharge period ($t_D$) from ($T_2$) to ($T_3$). On the other hand, from ($T_2$) to ($T_3$), since the voltage ($V_b$) of the cell (1b) is lower than the equalized voltage ($V_e$), the discharge circuit 60 of the cell (1b) is off and thus the cell (1b) is not discharged through the discharge circuit 60. At ($T_3$) during the discharge of the cell (1a), an external electric load (hereinafter referred to as a "load"), for example, a motor connected to the electric double layer capacitor apparatus 300 is turned on. During a load period ($t_L$) from ($T_3$) to ($T_5$), the electric double layer capacitor apparatus 300 supplies power to the load. Both cells (1a and 1b) are again charged during a charge period ($t_c$) from ($T_6$) to ($T_8$). As this operation is repeated, voltages of all cells 1 are equalized at the equalized voltage ($V_e$) after being charged.

Figure 15:
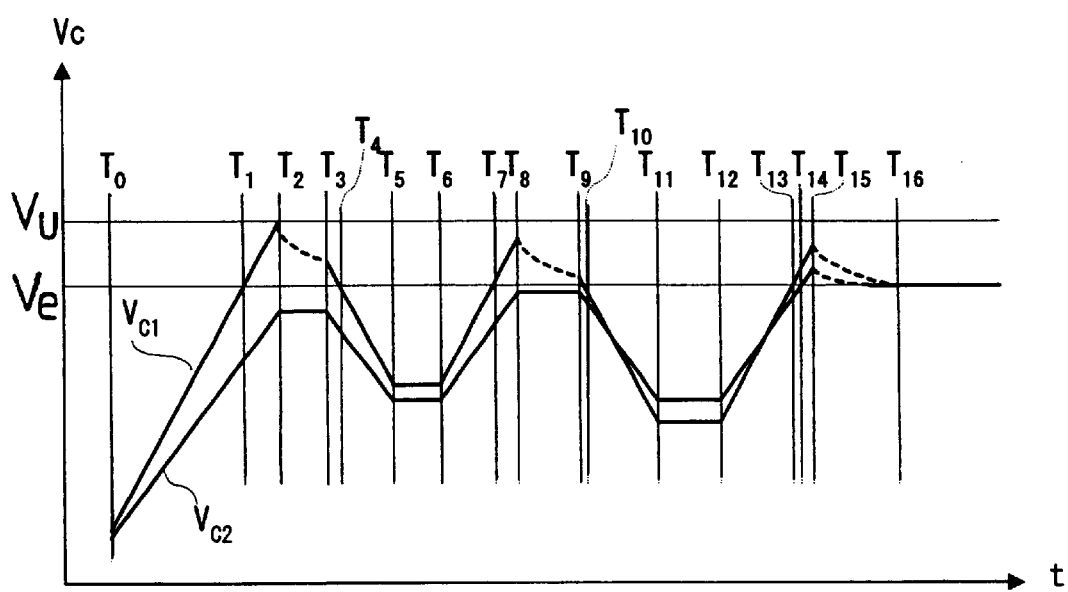
FIG. 15 graph showing changes of voltages of cells of the electric double layer capacitor apparatus shown in FIG. 1.

FIG. 15 is a more detailed graph of the graph shown in FIG. 2. Table 1 explains each timing in FIG. 15.

TABLE 1

| TIME | $T_0$ | $T_0$–$T_1$ | $T_1$ | $T_1$–$T_2$ | $T_2$ |
|---|---|---|---|---|---|
| STATE | START CHARGING | Charging | Charging | Charging | STOP CHARGING |
| Disc-cir1 | OFF | OFF | ON | ON | ON |
| $V_{C1}$ | Vc1 < Ve | V-UP | Vc1 > Ve | V-UP | Vc1 > Ve |
| Disc-cir2 | OFF | OFF | OFF | OFF | OFF |
| $V_{C2}$ | Vc2 < Ve | V-UP | Vc2 < Ve | V-UP | Vc2 < Ve |
| $T_2$–$T_3$ | $T_3$ | $T_3$–$T_4$ | $T_4$ | $T_4$–$T_5$ | $T_5$ |
| Waiting | START POWER Discharging | POWER Discharging | POWER Discharging | POWER Discharging | STOP POWER Discharging |
| ON | ON | ON | OFF | OFF | OFF |
| Adjustment | Vc1 > Ve | V-down | Vc1 > Ve | V-down | Vc1 < Ve |
| OFF | OFF | OFF | OFF | OFF | OFF |
| HOLD | Vc2 < Ve | V-down | Vc2 < Ve | V-down | Vc2 < Ve |
| $T_5$–$T_6$ | $T_8$ | $T_8$–$T_7$ | $T_7$ | $T_7$–$T_8$ | $T_8$ |
| Waiting | START CHARGING | Charging | Charging | Charging | STOP CHARGING |
| OFF | OFF | OFF | ON | ON | ON |
| HOLD | Vc1 < Ve | V-UP | Vc1 > Ve | V-UP | Vc1 > Ve |
| OFF | OFF | OFF | OFF | OFF | OFF |
| HOLD | Vc2 < Ve | V-UP | Vc2 < Ve | V-UP | Vc2 < Ve |
| $T_8$–$T_9$ | $T_9$ | $T_8$–$T_{10}$ | $T_{10}$ | $T_{10}$–$T_{11}$ | $T_{12}$ |
| Waiting | START POWER Discharging | POWER Discharging | POWER Discharging | POWER Discharging | START CHARGING |
| ON | ON | ON | OFF | OFF | OFF |
| Adjustment | Vc 1 > Ve | V-down | Vc 1 < Ve | V-down | Vc 1 < Ve |
| OFF | OFF | OFF | OFF | OFF | OFF |
| HOLD | Vc2 < Ve | HOLD | Vc2 < Ve | V-down | Vc2 < Ve |
| $T_{12}$–$T_{13}$ | $T_{13}$ | $T_{13}$–$T_{14}$ | $T_{14}$ | $T_{14}$–$T_{15}$ | $T_{15}$ |
| | STOP | | | | |
| Charging | Charging | Charging | Charging | Charging | CHARGING |
| OFF | ON | ON | ON | ON | ON |
| V-up | Vc1 > Ve | V-up | Vc1 > Ve | V-up | Vc 1 > Ve |

TABLE 1-continued

| OFF | OFF | OFF | ON | ON | ON |
|---|---|---|---|---|---|
| V-up | Vc2 < Ve | V-up | Vc2 > Ve | V-up | Vc2 > Ve |
| $T_{15}$–$T_{16}$ | $T_{16}$ | | | | |
| Waiting | Waiting | | | | |
| ON | OFF | | | | |
| Adjustment | Vc1 = Ve (equalized) | | | | |
| ON | OFF | | | | |
| Adjustment | Vc2 = Ve (equalized) | | | | |

The voltage detection circuit 50 and the discharge circuit 60 may be constructed as an analog circuit utilizing transistors and other discrete parts. In this case, circuits which have stable operations may be obtained at low costs. The voltage detection circuit may outputs voltage or current signals which represent the detected voltage. Also the voltage detection circuit 50 and the discharging circuit 60 may be constructed to be an IC.

Switching element of the discharge circuit is, for example, a transistor, another semiconductor or the like. When voltage of a cell 1 is higher than the equalized voltage ($V_e$), the switching element turns on to discharge the cell 1 via, for example, a resistor. On the other hand, when voltage of a cell 1 is equal to or lower than the equalized voltage ($V_e$), the switching element turns off and the cell 1 is not discharged.

The discharge circuit 60 does not necessarily operate while the cells 1 are charged. Accordingly, a resistor to which discharge current flows may have large resistance. Therefore, since a discharge current value may be small, an amount of heat generation of the resistor and power loss may be small. However, the discharge period during which the voltage of a cell 1 becomes equal to the equalized voltage ($V_e$) becomes longer as the resistance of the resistor increases. Accordingly, the resistance of the resistor is determined by balancing the discharge period and the heat amount. The resistor may be a variable resistor.

According to this embodiment of the present invention, because voltages of the cells 1 are equalized more precisely, the charging and power supplying ability of the electric double layer capacitor apparatus may be fully utilized and the apparatus may stably operates for a long period of time. Even though characteristics of the electric double layer capacitors are different, the electric double layer capacitor apparatus may be efficiently charged and discharged by compensating the characteristics differences.

Further, the maximum charge voltage and the predetermined target voltage may be determined for each cell according to characteristics of each cell.

Figure 3:
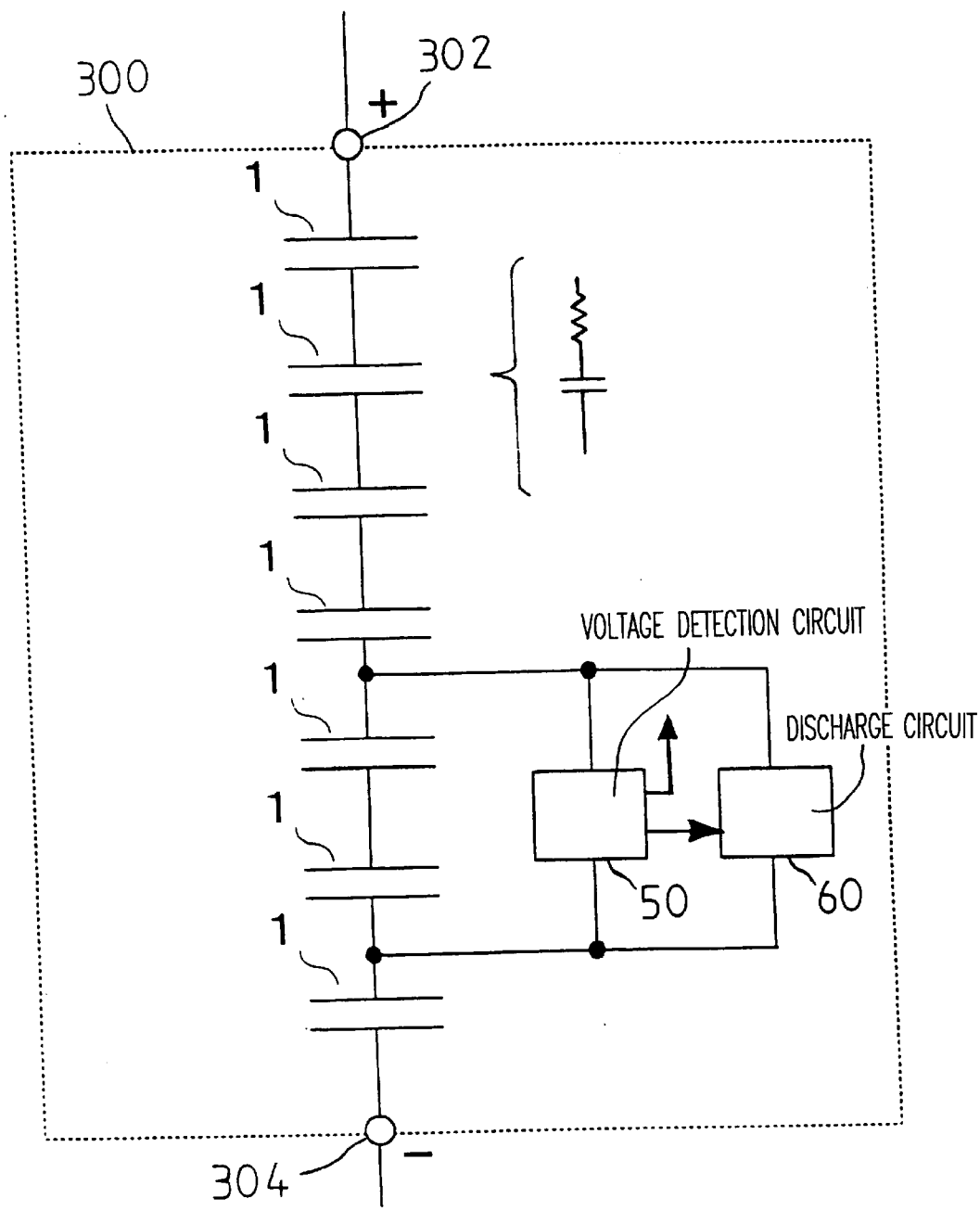
FIG. 3 is a block diagram showing an electric double layer capacitor apparatus according to an embodiment of the present invention.

Although each of all cells 1 has the voltage detection circuit 50 and the discharge circuit 60 as shown in FIG. 1, the electric double layer capacitor apparatus 300 may include only one voltage detection circuit 50 and one discharge circuit 60 as shown in FIG. 3. Referring to FIG. 3, one voltage detection circuit 50 and one discharge circuit 60 are connected to, for example, two cells 1 which are connected in series.

Figure 4:
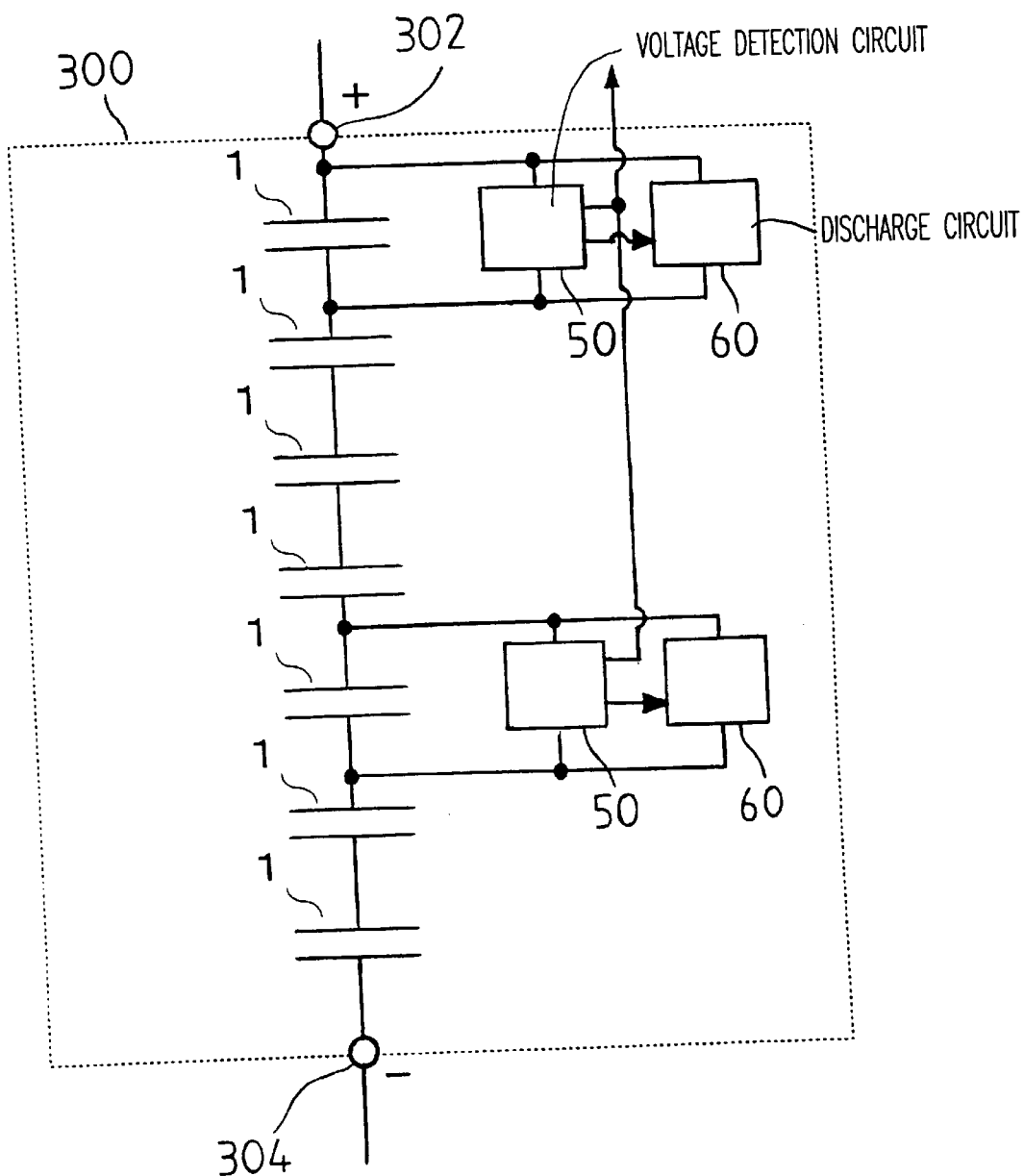
FIG. 4 is a block diagram showing an electric double layer capacitor apparatus according to an embodiment of the present invention.

Further, as shown in FIG. 4, some of all cells 1 may have the voltage detection circuits 50 and one discharge circuits 60, respectively. In this embodiment, the electric double layer capacitor apparatus 300 may include only one voltage detection circuit 50 which detects the terminal voltage of each of the plurality of the cells 1 by switching the connection between the one voltage detection circuit 50 and each of the plurality of the cells 1.

Figure 5:
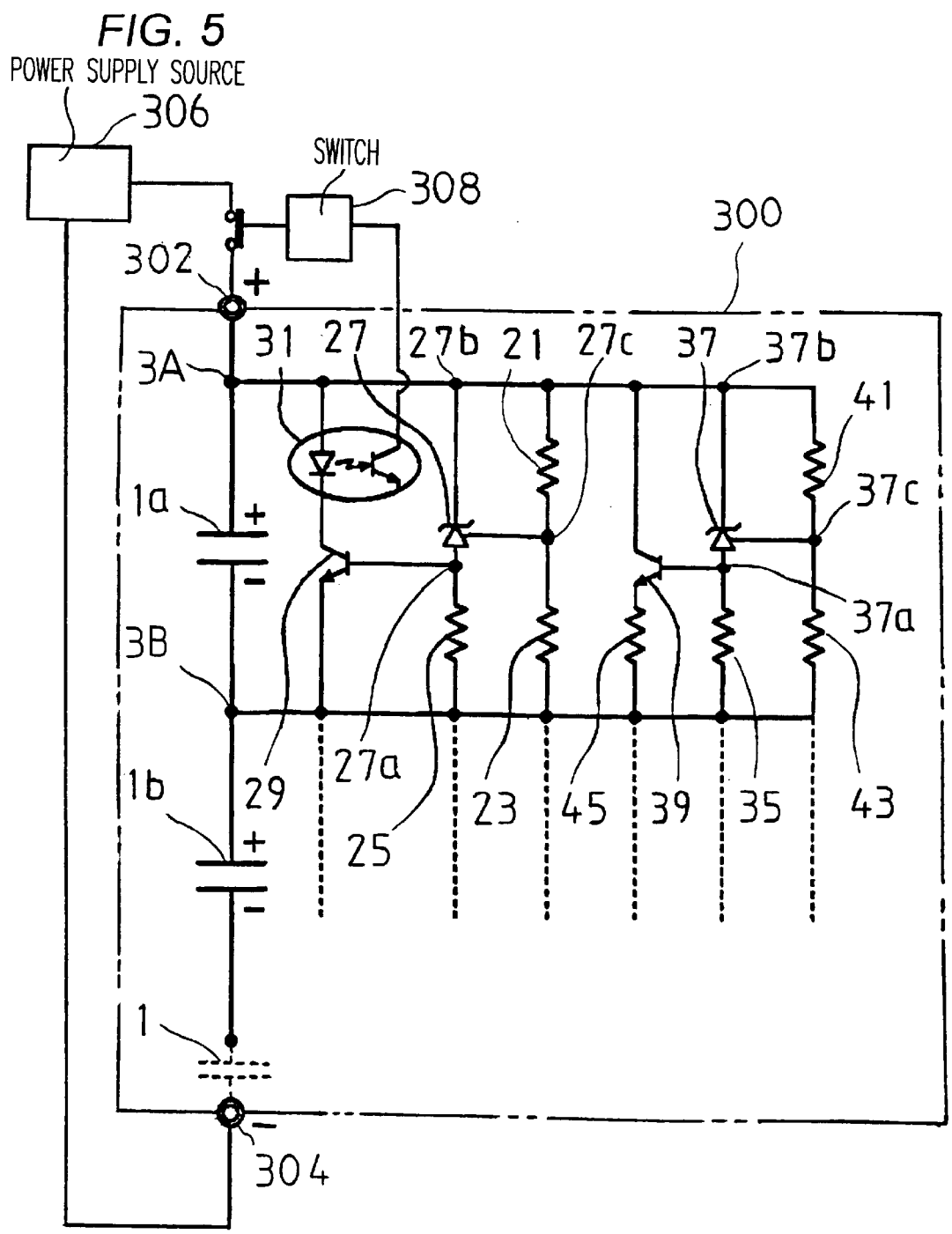
FIG. 5 is a block diagram showing an electric double layer capacitor apparatus according to an embodiment of the present invention.

FIG. 5 shows an electric double layer capacitor apparatus according to an embodiment of the present invention. Referring to FIG. 5, an electric double layer capacitor apparatus 300 includes a plurality of electric double layer capacitors 1. Since the plurality of cells 1 include same constructions, a circuit will be explained hereinafter with respect to a cell (1a).

A terminal (27b) of a first shunt regulator 27 is connected to a positive pole terminal (3A) of the cell (1a). Another terminal (27a) of the first shunt regulator 27 is connected to a negative pole terminal (3B) of the cell (1a) via a resistor 25. Further, the terminal (27a) of the first shunt regulator 27 is connected to a base of a first NPN transistor 29. A terminal (27c) of the first shunt regulator 27 is connected to one end of a resistor 21 and one end of a resistor 23. Another end of the resistor 21 is connected to the positive pole terminal (3A) of the cell (1a). Another end of the resistor 23 is connected to the negative pole terminal (3B) of the cell (1a).

An emitter of the first transistor 29 is connected to the negative pole terminal (3B) of the cell (1a). A collector of the first transistor 29 is connected to the positive pole terminal (3A) of the cell (1a) via a photocoupler 31.

A terminal (37b) of a second shunt regulator 37 is connected to the positive pole terminal (3A) of the cell (1a). Another terminal (37a) of the second shunt regulator 37 is connected to the negative pole terminal (3B) of the cell (1a) via a resistor 35. Further, the terminal (37a) of the second shunt regulator 37 is connected to a base of a second NPN transistor 39. A terminal (37c) of the second shunt regulator 37 is connected to one end of a resistor 41 and one end of a resistor 43. Another end of the resistor 41 is connected to the positive pole terminal (3A) of the cell (1a). Another end of the resistor 43 is connected to the negative pole terminal (3B) of the cell (1a).

A collector of the second transistor 39 is connected to the positive pole terminal (3A) of the cell (1a). An emitter of the second transistor 39 is connected to the negative pole terminal (3B) of the cell (1a) via a resistor 45.

All of the cells 1 and all of the circuits are contained in a box to constitute an electric double layer capacitor apparatus 300. The electric double layer capacitor apparatus 300 further includes positive and negative terminals (302 and 304) which are connected to a power supply source 306 via a switch 308. The switch 308 is controlled by the photocoupler 31. The power supply source 306 is configured to supply current to the electric double layer capacitor apparatus 300 in order to charge the cells 1.

An operation voltage of the first shunt regulator 27 is set at the maximum charge voltage ($V_u$) of the cell 1. The operation voltage may be determined by adjusting a ratio of resistance of the resistors (21 and 23). When the voltage between the positive and negative pole terminals (3A and 3B) is equal to or higher than the maximum charge voltage ($V_u$), the first shunt regulator 27 turns on and therefore current flows to the resistor 25. The first transistor 29 amplifies a signal which shows that the voltage between the positive and negative pole terminals (3A and 3B) is equal to or higher than the maximum charge voltage ($V_u$). According to the signal, the photocoupler 31 operates to open the switch 308. Accordingly, the power supply source 306 stops to supply electric power to the electric double layer capacitor apparatus 300.

An operation voltage of the second shunt regulator 37 is set at the equalized voltage ($V_e$) which is lower than the maximum charge voltage ($V_u$). The equalized voltage ($V_e$) is determined based on a ratio of resistance of the resistors (41 and 43). When the voltage between the positive and negative pole terminals (3A and 3B) of a cell 1 is higher than the equalized voltage ($V_e$) after the power supply source 306 stops the power supply to the electric double layer capacitor apparatus 300, the second shunt regulator 37 turns on and therefore current flows to the resistor 35. Accordingly, the second transistor 39 turns on and thus the cell 1 discharges through the resistor 45. When the voltage between the positive and negative pole terminals (3A and 3B) of the cell 1 is equal to or lower than the equalized voltage ($V_e$), the second shunt regulator 37 turns off and therefore the second transistor 39 turns off. Accordingly, the cell 1 maintains its voltage at that voltage.

The second transistor 39 turns on even during the charging period of the cell 1 when the voltage between the positive and negative pole terminals (3A and 3B) is higher than the equalized voltage ($V_e$). However, the resistor 45 may have large resistance because the resistor 45 does not have a function of bypassing the cell 1 while cells 1 are charged. Accordingly, since the resistor 45 has large resistance, a power consumption of the resistor 45 is small. Therefore, there is no problem even though the second transistor 39 turns on during the charging period of the electric double layer capacitor 1.

The circuit may be constructed such that the second transistor 39 does not turn on during the charging period of the cell 1 and turns on when the charging period is complete and when the voltage between the positive and negative pole terminals (3A and 3B) is higher than the equalized voltage ($V_e$). According to this embodiment of the present invention, because voltages of the cells 1 are equalized more precisely, the charging and power supplying ability of the electric double layer capacitor apparatus 300 may be fully utilized and the apparatus may stably operates for a long period of time. Even though characteristics of the electric double layer capacitors are different, the electric double layer capacitor apparatus may be efficiently charged and discharged by compensating the characteristics differences.

Although shunt regulators are utilized in this embodiment, other semiconductors which has similar reference voltage accuracy may be utilized.

Figure 7:
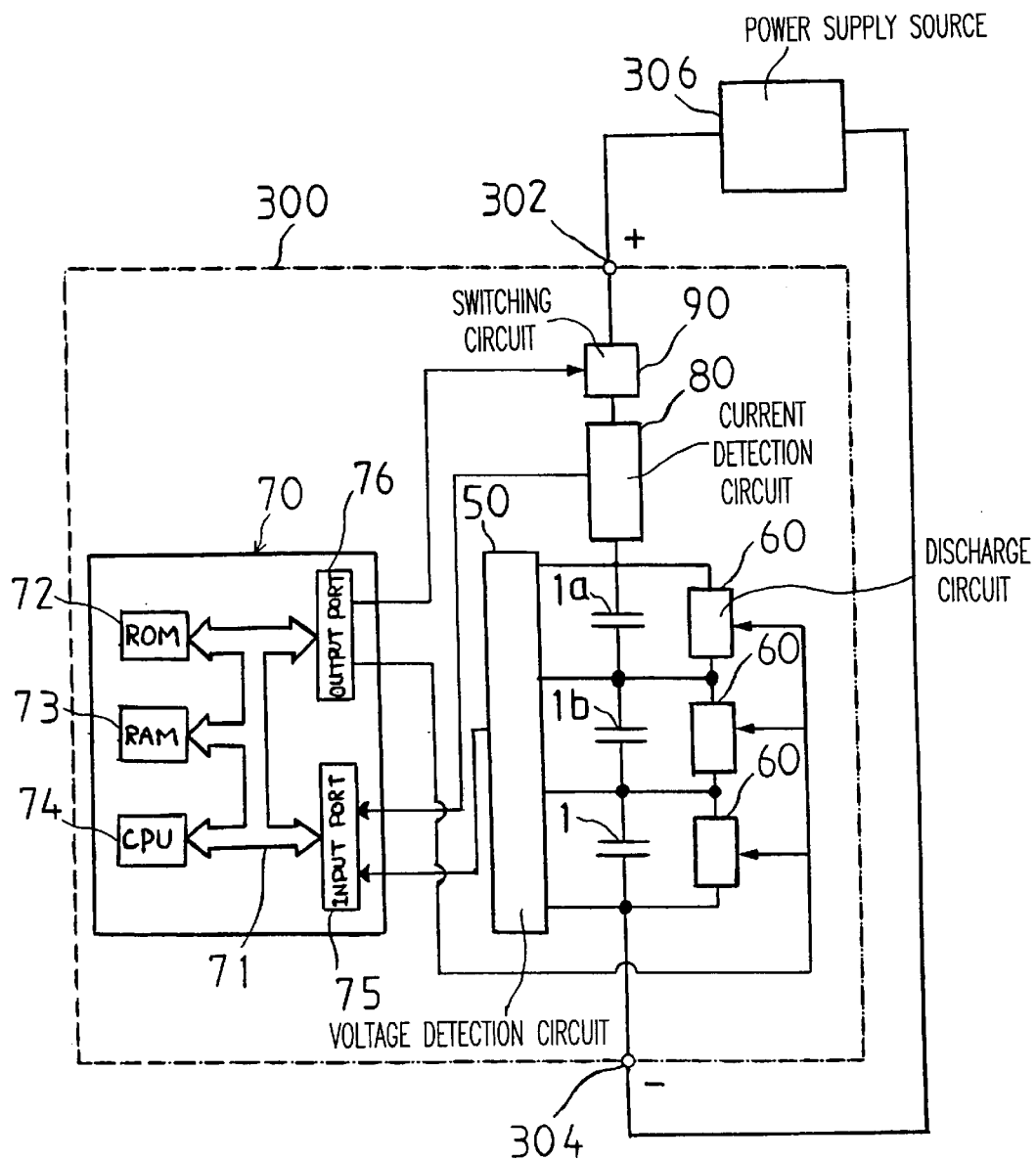
FIG. 7 is a block diagram showing an electric double layer capacitor apparatus according to an embodiment of the present invention.

FIG. 7 shows an electric double layer capacitor apparatus according to an embodiment of the present invention. Referring to FIG. 7, an electric double layer capacitor apparatus 300 includes a plurality of electric double layer capacitors 1, discharge circuits 60 corresponding to respective cells 1, a voltage detection circuit 50, an electronic control unit 70, a current detection circuit 80, and a switching circuit 90. The electric double layer capacitor apparatus 300 further includes positive and negative terminals (302 and 304) which are connected to a power supply source 306. The power supply source 306 is configured to supply current to the electric double layer capacitor apparatus 300 in order to charge the cells 1.

The electronic control unit 70 is constructed as a microprocessor and includes a ROM (read only memory) 72, a RAM (random access memory) 73, a CPU (microprocessor) 74, an input port 75, and an output port 76. The ROM 72, the RAM 73, the CPU 74, the input port 75, and the output port 76 are interconnected via a bidirectional bus 71.

The discharge circuit 60 is configured to discharge the corresponding cell 1 and connected to the output port 76. The voltage detection circuit 50 is configured detect voltage of each cell 1 and connected to the input port 75. The current detection circuit 80 is configured detect the current of the electric double layer capacitor apparatus 300 and connected to the input port 75. The switching circuit 90 is configured to stop the power supply to the electric double layer capacitor apparatus 300 from the power supply source 306 and connected to the output port 76.

Figure 8:
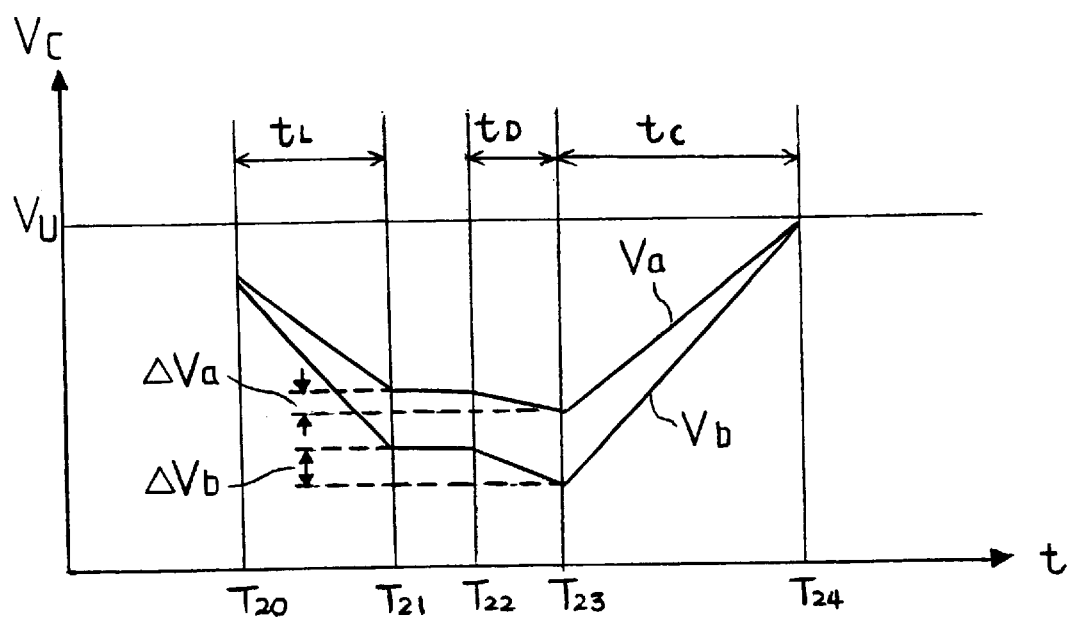
FIG. 8 is a graph showing changes of voltages ($V_a$ and $V_b$) of cells of the electric double layer capacitor apparatus shown in FIG. 7.

FIG. 8 illustrates changes of voltages ($V_a$ and $V_b$) of cells 1, for example, cells (1a and 1b). Referring to FIGS. 7 and 8, during a load period ($t_L$) from ($T_{20}$) to ($T_{21}$), the electric double layer capacitor apparatus 300 supplies power to the load. Accordingly, voltages of both cells (1a and 1b) decrease. Before charging the cells 1, voltage differences ($\Delta V_a$ and $\Delta V_b$) are calculated such that the voltages ($V_a$ and $V_b$) of both cells (1a and 1b) become equal to the maximum charge voltage ($V_u$) substantially simultaneously while being charged. During a discharge period ($t_D$) from ($T_{22}$) to ($T_{23}$), both cells (1a and 1b) are discharged such that each voltage ($V_a$ or $V_b$) reduce by the voltage difference ($\Delta V_a$ or $\Delta V_b$). During a charge period ($t_c$) from ($T_{23}$) to ($T_{24}$), both cells (1a and 1b) are charged. The voltages ($V_a$ and $V_b$) of both cells (1a and 1b) become equal to the maximum charge voltage ($V_u$) at ($T_{24}$) at the same time. In this case, the maximum charge voltage ($V_u$) is equal to the equalized voltage ($V_e$).

Figure 9:
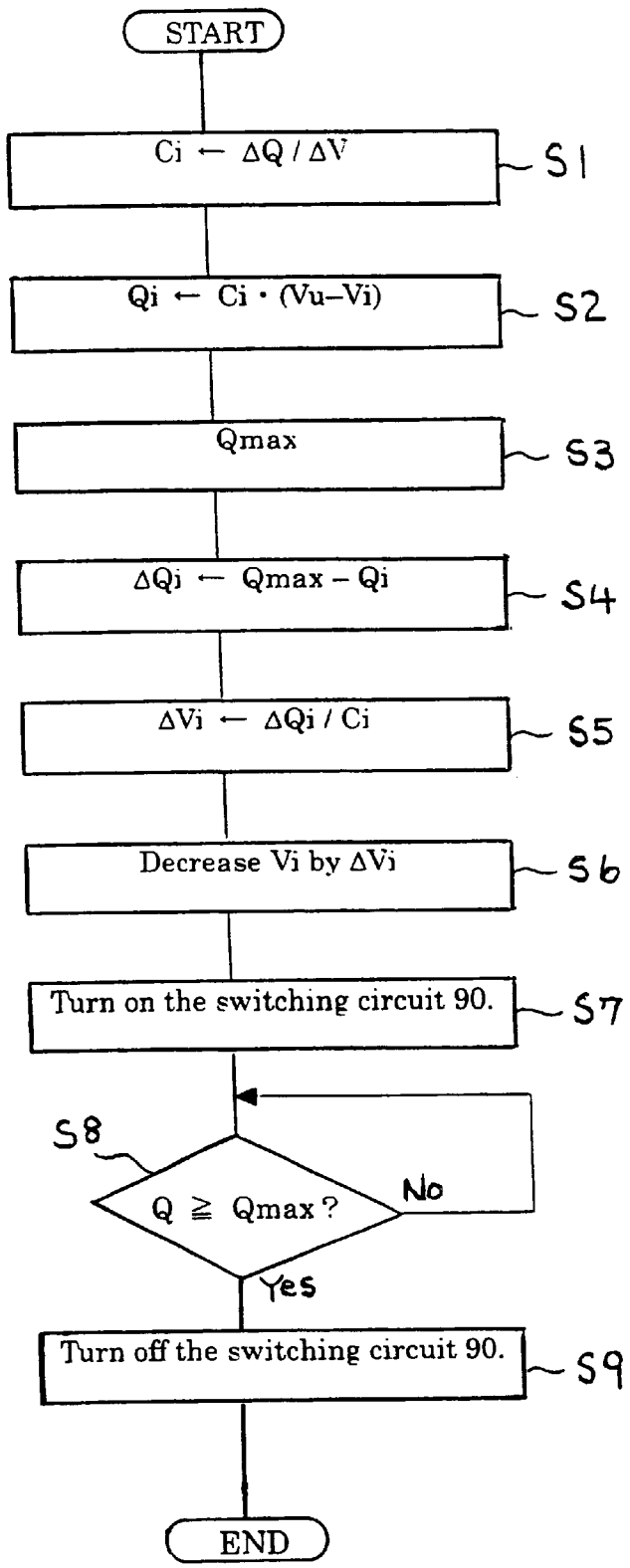
FIG. 9 is a flow chart for charging the cells of the electric double layer capacitor apparatus shown in FIG. 7.

FIG. 9 is a flow chart for charging the cells 1. Referring to FIGS. 7 and 9, at step (S1), capacitance (Ci) of each cell 1 is calculated based on a change ($\Delta Q$) of charge amount and a change ($\Delta V$) of voltage according to the following equation.

$$Ci = \Delta Q / \Delta V$$

The changes ($\Delta Q$) of charge amounts are calculated based on current detected by the current detection circuit 80. The changes ($\Delta V$) of voltage are calculated based on the voltage detected by the voltage detection circuit 50.

At step (S2), a charge amount (Qi) for each cell 1 which is necessary to increase the voltage of each cell 1 to the maximum charge voltage ($V_u$) is calculated according to the following equation:

$$Qi = Ci * (V_u - Vi)$$

where Vi is voltage of each cell 1 at that time.

At step (S3), the maximum charge amount (Qmax) among the charge amounts (Qi) is determined. At step (S4), each charge amount difference ($\Delta Qi$) between the maximum charge amount (Qmax) and each charge amount (Qi) is calculated.

At step (S5), each voltage difference ($\Delta Vi$) is calculated according to the following equation.

$$\Delta Vi = \Delta Qi / Ci$$

At step (S6), the electronic control unit 70 controls each discharge circuit 60 to discharge each cell 1 such that the voltage (Vi) of each cell is decreased by each voltage difference ($\Delta Vi$). Then, at step (S7), the electronic control unit 70 turns on the switching circuit 90. Accordingly, the power supply source 306 supplies substantial constant current to the electric double layer capacitor apparatus 300 in order to charge the cells 1.

At step (S8), the electronic control unit 70 determines whether charging amount (Q) during this charge period is equal to or higher than the maximum charge amount (Qmax). When the charging amount (Q) is smaller than the maximum charge amount (Qmax), the power supply source 306 continues to supply constant current to the electric double layer capacitor apparatus 300. When the charging amount (Q) is equal to or higher than the maximum charge amount (Qmax), the routine goes to step (S9). At step (S9), the electronic control unit 70 turns off the switching circuit 90. Accordingly, the power supply source 306 stops supplying constant current to the electric double layer capacitor apparatus 300.

According to this embodiment of the present invention, because voltages of the cells 1 are equalized at the maximum charge voltage ($V_u$), the charging and power supplying ability of the electric double layer capacitor apparatus may be fully utilized.

In Step 9 (S9) the stop operation of supplying current to the electric double layer capacitor apparatus 300 may be done when the voltage of cell 1 is detected to be equal to the maximum charge voltage ($V_u$) by the voltage detection circuit 50. After stopping the charging current, the terminal voltage of cell 1 drops about I*R voltage drop ($I_c*R_{in}$) from the maximum charge voltage ($V_u$).

Figure 10:
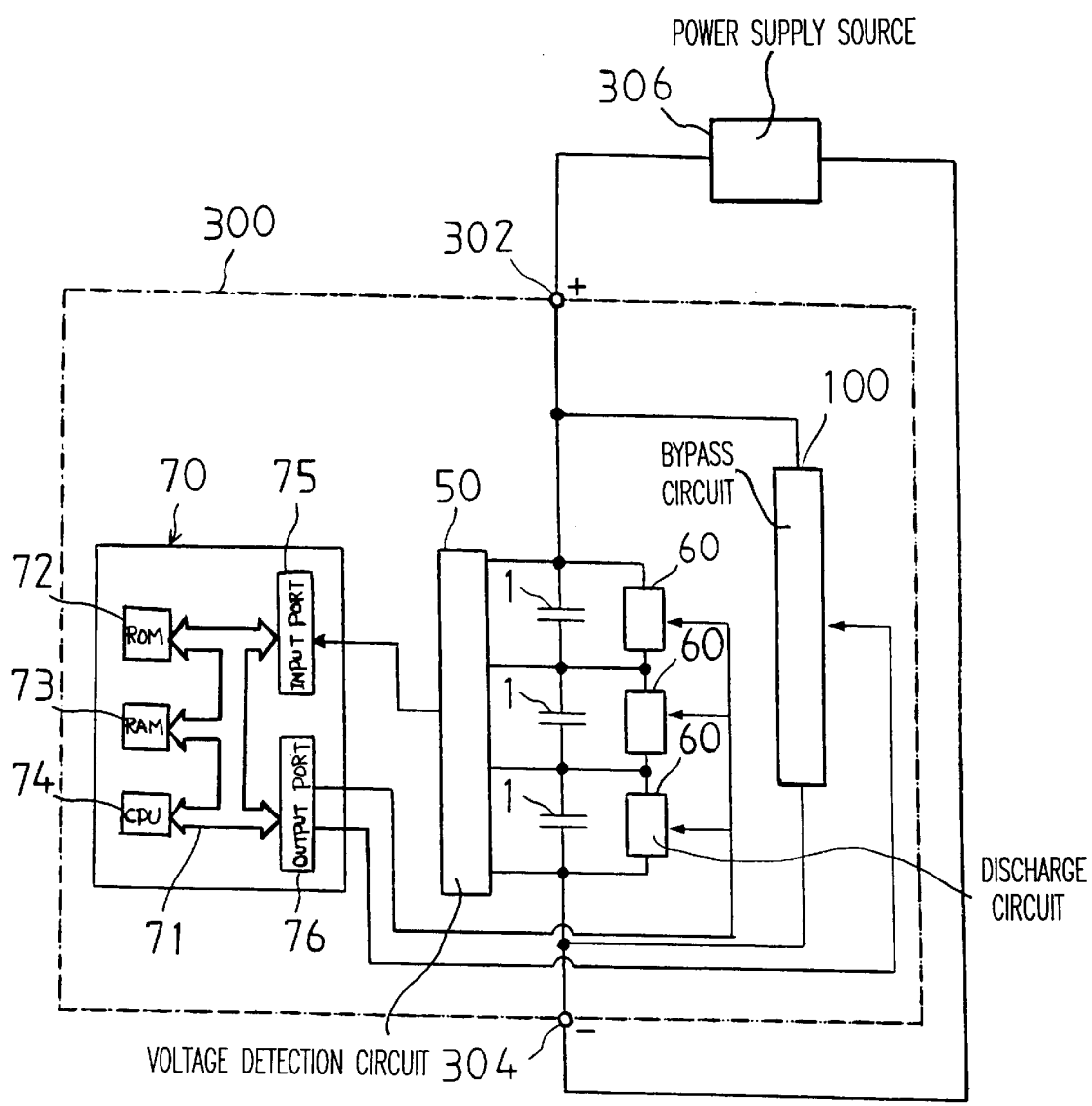
FIG. 10 is a block diagram showing an electric double layer capacitor apparatus according to an embodiment of the present invention.

FIG. 10 shows an electric double layer capacitor apparatus according to an embodiment of the present invention. Referring to FIG. 10, an electric double layer capacitor apparatus 300 includes a plurality of electric double layer capacitors 1, discharge circuits 60 corresponding to respective cells 1, a voltage detection circuit 50, an electronic control unit 70, and a bypass circuit 100. The electric double layer capacitor apparatus 300 further includes positive and negative terminals (302 and 304) which are connected to a power supply source 306. The power supply source 306 is configured to supply constant current to the electric double layer capacitor apparatus 300 in order to charge the cells 1.

The bypass circuit 100 is connected to the cells 1 in parallel and configured to bypass all cells 1.

Figure 11:
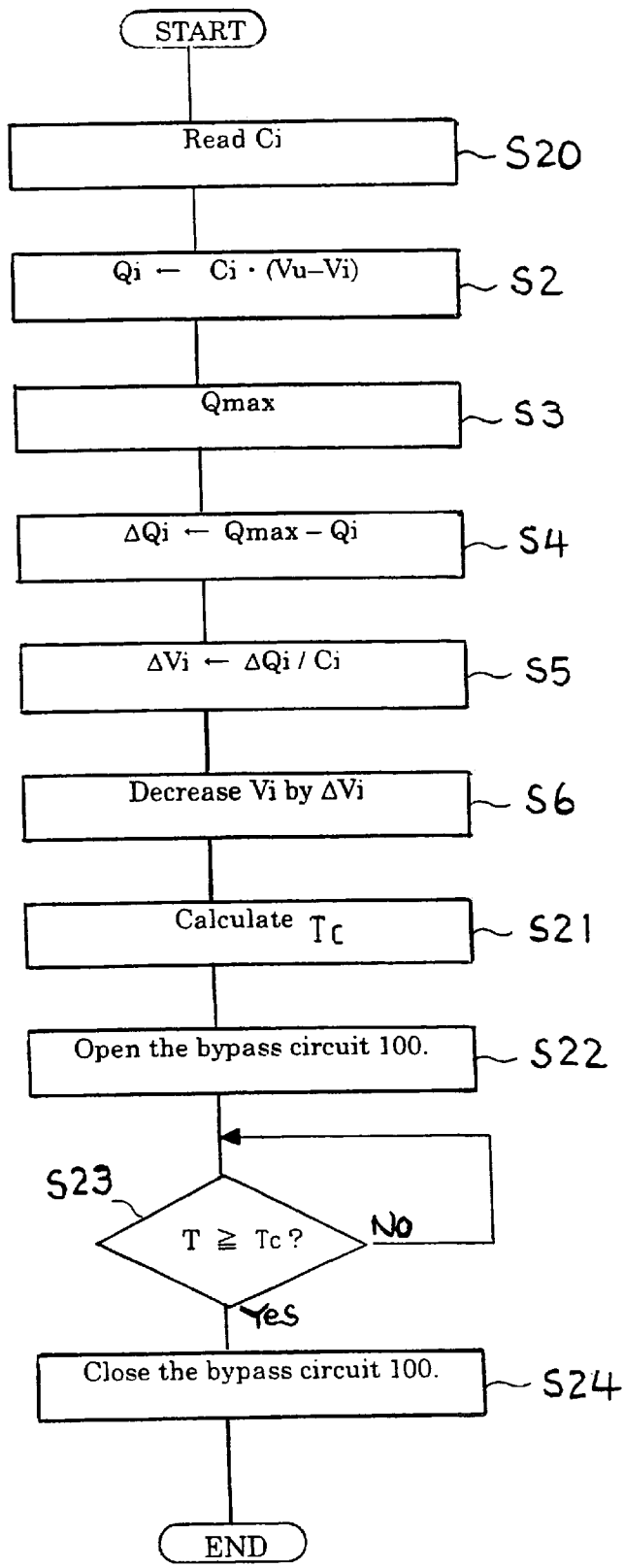
FIG. 11 is a flow chart for charging the cells of the electric double layer capacitor apparatus shown in FIG. 10.

FIG. 11 is a flow chart for charging the cells 1. Basically, the operation of this embodiment is similar to the embodiment shown in FIGS. 7–9. Referring to FIGS. 10 and 11, at step (S20), capacitance (Ci) of each cell 1 is read from the ROM 72. The capacitance (Qi) of each cell 1 have been memorized in the ROM 72.

At step (S21), a charge time ($T_c$) during which the maximum charge amount (Qmax) is charged to a cell 1 is calculated. Then, at step (S22), the electronic control unit 70 opens the bypass circuit 100. Accordingly, the power supply source 306 supplies constant current to the cells 1 in order to charge the cells 1.

At step (S23), the electronic control unit 70 determines whether the charge time ($T_c$) has elapsed since the charge of the cells 1 started. When the electronic control unit 70 determines that the charge time ($T_c$) has not elapsed, the power supply source 306 continues to supply substantial constant current to the cells 1. When the electronic control unit 70 determines that the charge time ($T_c$) has elapsed, the routine goes to step (S24). At step (S24), the electronic control unit 70 closes the bypass circuit 100. Accordingly, the power supply source 306 stops supplying constant current to the cells. At this time, voltages of all cells become equal to the maximum charge voltage ($V_u$) at the same time.

In step (S24) the stop operation of supplying current to the electric double layer capacitor apparatus 300 may be done when the voltage of cell 1 is detected to be equal to the maximum charge voltage ($V_u$) by the voltage detection circuit 50. After stopping the charging current, the terminal voltage of cell 1 drops about I*R voltage drop ($I_c*R_{in}$) from the maximum charge voltage ($V_u$).

In the above embodiments, it is preferable to provide a voltage detection circuit 50 and a discharge circuit 60 to each of all cells 1 in order to control voltage of the cells more accurately.

The number of the cells 1 is determined considering the maximum charge voltage of the electric double layer capacitor apparatus 300. The endurance voltage of a cell 1 whose electrolytic solution is organic solution is about 3 (V). The endurance voltage of a cell 1 whose electrolytic solution is water solution is about 1 (V). Capacitance values of several (F) to tens of thousands (F) are available. For example, when the maximum charge voltage is from DC 750 (V) to 5,000 (V), it is preferable to determine the number of cells 1 to be from 188 to 3025. When the maximum charge voltage is from AC 100 (V) to 600 (V), it is preferable to determine the number of cells 1 to be from 36 to 512. For a general low voltage power source for controlling, it is preferable to determine the number of cells 1 to be from 3 to 30.

It is preferable to determine that the voltage range in which voltage of a cell 1 is adjustable by discharging the cell 1 via a discharge circuit 60 is from 50 (mV) to 900 (mV). The voltage range is determined considering both a frequency of the voltage equalization discharge and power loss because of the discharge.

It is preferable that relative dispersion of capacitance of cells 1 is within ±20%. It is more preferable that the relative dispersion of capacitance of cells 1 is within ±15%. If the relative dispersion is too large, the time to equalize voltages of cells 1 increases and thus power loss increases.

Furthermore, it is preferable that charge current is larger than 10 (A). It is more preferable that charge current is larger than 25 (A), because superior characteristics of an electric double layer capacitor may be utilized.

The electric double layer capacitor apparatus according to the present invention may be suitably utilized as a power source for systems. It is preferable that such systems are not operated during nighttime, such as, for example, elevators. During daytime, charging the electric double layer capacitor apparatus and supplying power from the electric double layer capacitor apparatus to a load are repeated. During this period, the discharge circuit consume a little power. During a long period in which the load is not operated, for example, during nighttime, voltages of the cells are slowly equalized. Therefore, dispersion of the voltages of the cells are compensated.

The electric double layer capacitor apparatus according to the present invention may be further utilized as a power source for systems which have motors, for example, electric cars, hybrid cars, electric trains and the like.

Figure 12:
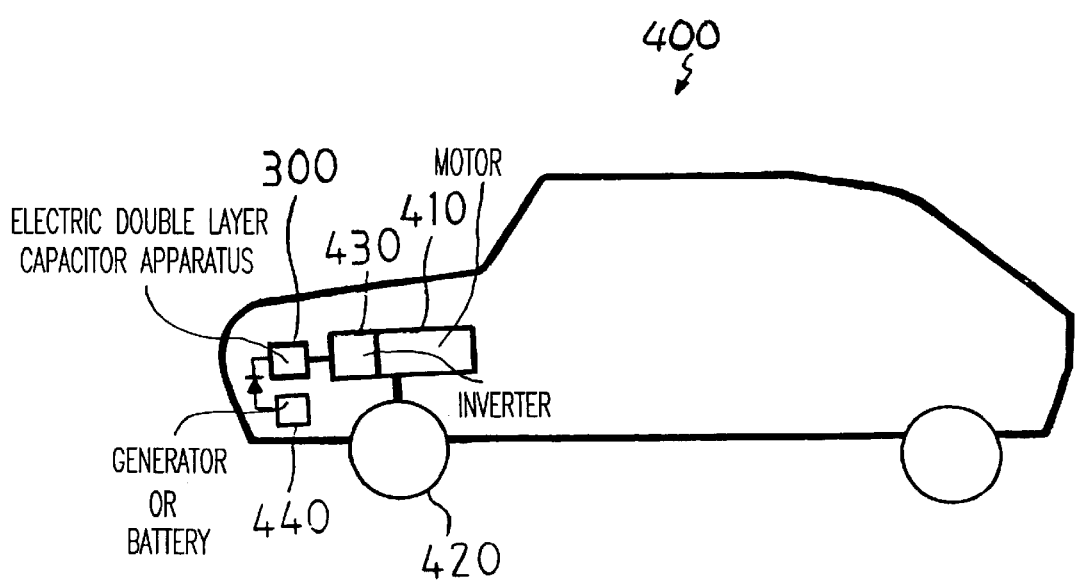
FIG. 12 is a block diagram showing a vehicle having an electric double layer capacitor apparatus according to an embodiment of the present invention.
Figure 13:
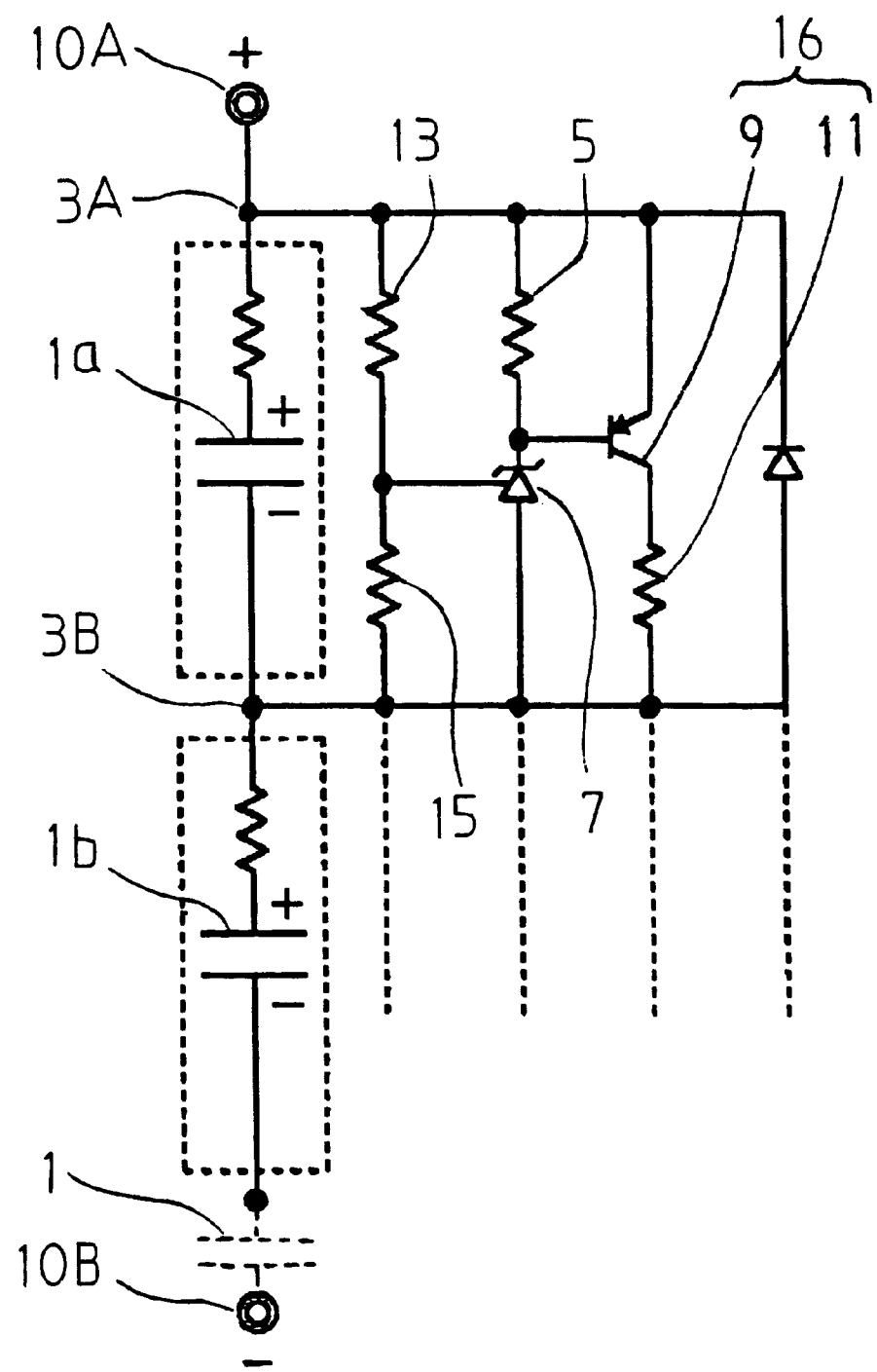
FIG. 13 is a block diagram showing a conventional electric double layer capacitor apparatus.
Figure 14:
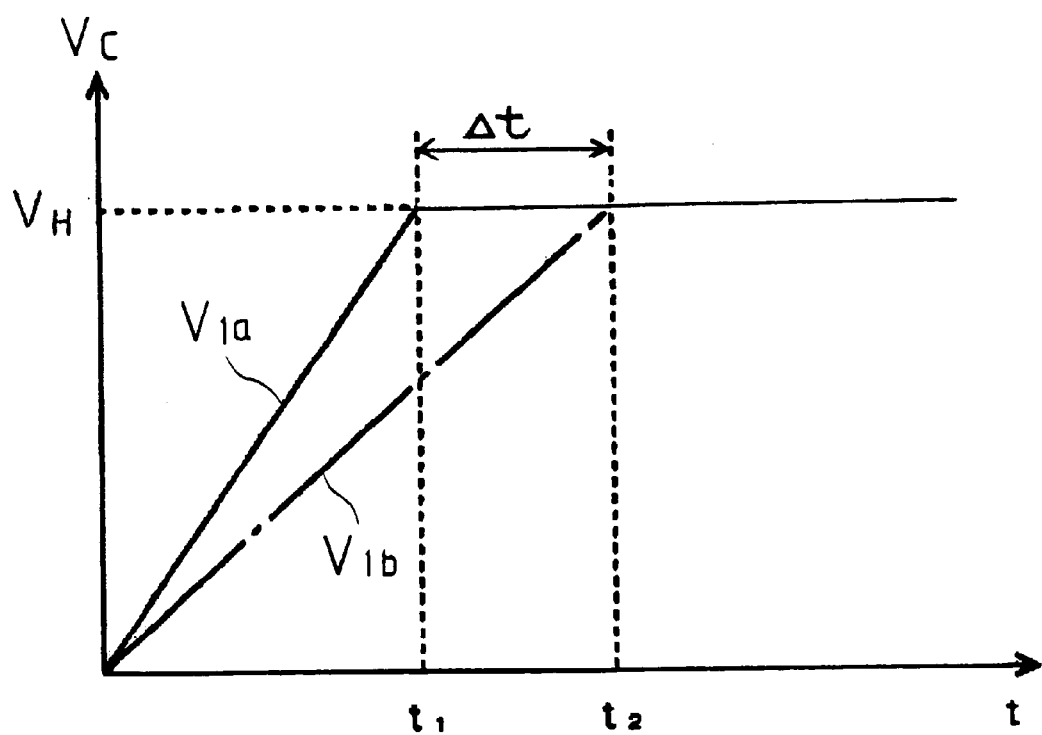
FIG. 14 is a graph showing changes of voltages of cells of the electric double layer capacitor apparatus shown in FIG. 13.

FIG. 12 shows an electric car 400. The car 400 includes a motor 410 and inverter 430, generator or battery 440 for rotating wheels 420, and an electric double layer capacitor apparatus 300 which supplies power to the motor 410 and reserves the output power of regenerative breaking.

According to the embodiments of the present invention, because voltages of the cells 1 are equalized more precisely, the charging and power supplying ability of the electric double layer capacitor apparatus may be fully utilized.

EXAMPLE 1

In the embodiment as shown in FIG. 5, it is supposed that the number of cells 1 is two, the capacitance ($C_1$) of first cell (1a) is 1000 (F), the capacitance ($C_2$) of second cell (1b) is 1150 (F), the maximum charge voltage ($V_u$) is 2.5 (V), the charge current is constant current of 10 (A), the equalization voltage ($V_e$) is 2.1 (V), the initial voltage of the first and second cells (1a and 1b) is 0 (V), and the resistance (R) of the resistor 45 is 100 (Ω). The cell is a type of organic electrolytic solution.

Figure 6:
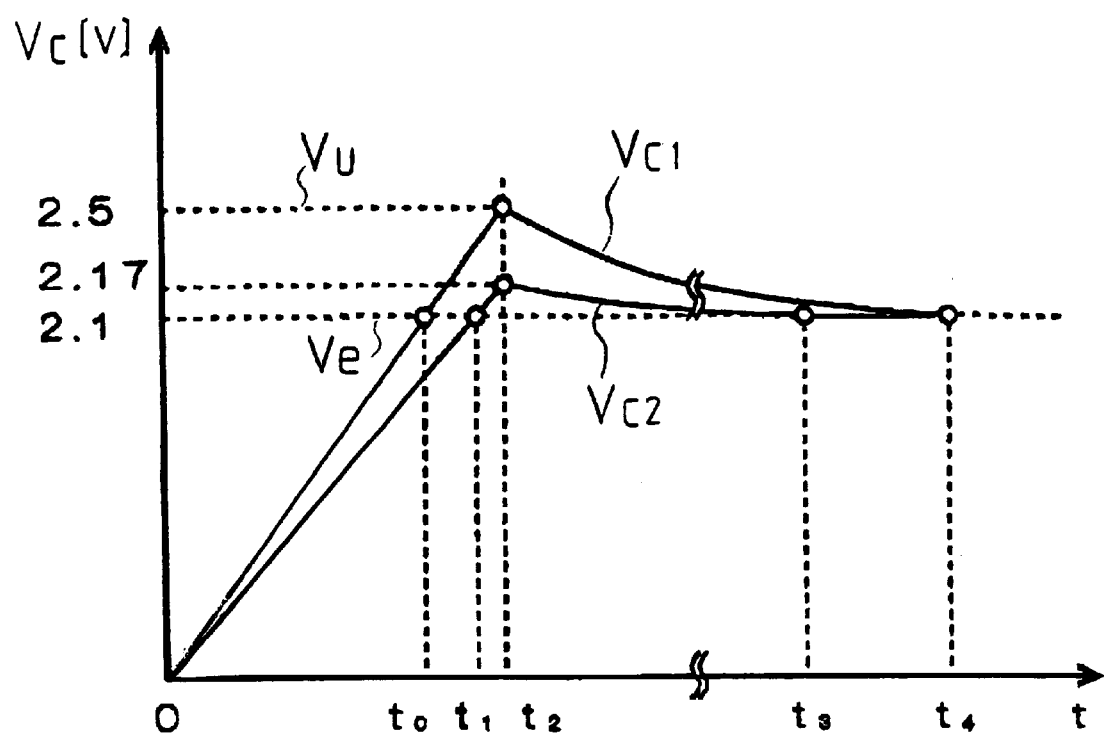
FIG. 6 is a graph showing changes of voltages of cells ($1a$ and $1b$) of the electric double layer capacitor apparatus shown in FIG. 5.

Referring to FIGS. 5 and 6, the voltages of the first and second cells (1a and 1b) linearly increase because the charge current is constant. At ($t_2$), the voltage ($V_a$) of the first cell (1a) which has smaller capacitance becomes equal to the maximum charge voltage ($V_u$) of 2.5 (V) first. Accordingly, at ($t_2$), the first transistor 29 turns on and thus the photocoupler 31 operates to open the switch 308. Accordingly, the power supply source 306 stops to supply electric power to the electric double layer capacitor apparatus 300. At this time, the voltage of the second cell (1b) is 2.17 (V).

When the voltages of the first and second cells (1a and 1b) are higher than the equalized voltage ($V_e$) of 2.1 (V), the second NPN transistor 39 turns on. ($t_0$) is about 210 seconds and ($t_1$) is about 242 seconds. The second cell (1b) is discharged until ($t_3$) at which the voltage of the second cell (1b) becomes equal to 2.1 (V). Similarly, the first cell (1a) is discharged until ($t_4$).

The voltages ($V_{c1}$ and $V_{c2}$) of the first and second cells (1a and 1b) between ($t_2$) and ($t_4$) or ($t_3$) is calculated as follows:

$$V_{c1}=2.5 \exp(-t/\tau_1),$$

$$\tau_1=R*C_1=100(\Omega)*1000(F)=10^5 \text{ seconds},$$

$$V_{c2}=2.17 \exp(-t/\tau_2),$$

and $$\tau_2=R*C_2=100(\Omega)*1150(F)=1.15\times10^5 \text{ seconds},$$

where (t) is a period of time from ($t_2$).

Accordingly, ($t_3$) is about 4000 seconds and ($t_4$) is about 18000 seconds. The maximum discharge current ($i_1$) of the first cell (1a) is about 25 (mA) ($i_1$=2.5 (V)/100(Ω)=25 (mA)). The maximum discharge current ($i_2$) of the second cell (1b) is about 22 (mA) ($i_2$=2.17 (V)/100(Ω)=22 (mA)).

Because the discharge current is small, the power consumption and heat generation of the discharge circuit 60 which includes the NPN transistor 39 and the resistor 45 is small. The maximum power consumption (P) is 2.5 (V)*25 (mA)=62.5 (mW).

Further, the discharge circuit 60 discharges, for example, the first cell (1a) between ($t_0$) and ($t_2$). However, because the discharge current (25 (mA)) is considerably small comparing to the charge current (10 (A)), the discharge during the charging period may be neglected.

As described above, even though capacitances of the cells 1 are different, voltages of the cells 1 are maintained at the equalized voltage ($V_e$) after the cells 1 are discharged. Namely, voltages of the cells 1 are equalized at the equalized voltage ($V_e$)

In FIG. 6, the voltages ($V_{c1}$ and $V_{c2}$) of the first and second cells (1a and 1b) are higher than the equalized voltage ($V_e$) when charging is complete. However, all of the cells 1 necessarily are charged to have voltages higher than the equalized voltage ($V_e$). Namely, cells 1 (discharge capacitors) whose voltages are higher than the equalized voltage ($V_e$) are discharged such that the voltages are equal to the equalized voltage ($V_e$). On the other hand, cells 1 whose voltages are lower than the equalized voltage ($V_e$) are not discharged and maintained at those voltages. Accordingly, as the this operation repeats, voltages of all cells are equal to the equalized voltage ($V_e$)

EXAMPLE 2

In the embodiment as shown in FIG. 5, referring to Tables 2 and 3, it is supposed that the number of cells 1 is three, the capacitance ($C_1$) of a first cell is 1225 (F), the capacitance ($C_2$) of a second cell is 1204 (F), the capacitance ($C_3$) of a third cell is 1185 (F), an internal resistance of the first cell is 2.3 (mΩ), an internal resistance of the second cell is 2.1 (mΩ), an internal resistance of the third cell is 2.2 (mΩ), the maximum charge voltage ($V_u$) is 2.5 (V), the charge current is constant current of 25 (A), the equalization voltage ($V_e$) is 2.4 (V), and the discharge resistance (R) of the resistor 45 is 5(Ω). In this example 2, the equalization of the three terminal voltage is achieved within 20 mV in one state and within 10 mV in another state.

TABLE 2

| Cell | Capacitance [F] | Internal Resistance [mΩ] | Vv [V] | Ve [V] |
|---|---|---|---|---|
| $C_1$ | 1225 | 2.3 | 2.50 | 2.40 |
| $C_2$ | 1204 | 2.1 | 2.50 | 2.40 |
| $C_3$ | 1185 | 2.2 | 2.50 | 2.40 |

TABLE 3

| | 1 Initial | 2 After Charge | 3 Before Equalization | 4 After Equalization | 5 After Discharge Power | 6 After Charge | 7 Before Equalization | 8 After Equalization |
|---|---|---|---|---|---|---|---|---|
| Time | Approx. 1.5 min. | | Approx. 2.5 min. | | Approx. 1 min. | Approx. 1 min. | Approx. 2.5 min. | |
| $C_1$ | 0.28 | 2.42 | 2.38 | 2.38 | 1.03 | 2.45 | 2.42 | 2.40 |
| $C_2$ | 0.34 | 2.47 | 2.41 | 2.40 | 1.01 | 2.50 | 2.46 | 2.40 |
| $C_3$ | 0.24 | 2.50 | 2.46 | 2.40 | 0.99 | 2.47 | 2.45 | 2.40 |

Note: Resistance of Discharge Resistor: $RC_1 = RC_2 = RC_3 = 5\Omega$
Charge Current 1c = 25A, Discharge Current 1d = 25A

EXAMPLE 3

In an example of Table 4, the resistance of the discharge resistor for the third cell is 1(Ω). In this example 3, the equalization of the three terminal voltages is achieved within 10 mV in one state.

TABLE 4

| | 1 Initial | 2 After Charge | 3 Before Equalization | 4 After Equalization |
|---|---|---|---|---|
| Time | | Approx. 2 min. | Approx. 1 min. | |
| $C_1$ | 0.18 | 2.43 | 2.40 | 2.40 |
| $C_2$ | 0.22 | 2.47 | 2.42 | 2.40 |

TABLE 4-continued

| Time | 1<br>Initial | 2<br>After<br>Charge<br>Approx. 2 min. | 3<br>Before<br>Equalization | 4<br>After<br>Equalization<br>Approx.1 min. |
|---|---|---|---|---|
| $C_3$ | 0.20 | 2.50 | 2.48 | 2.40 |

Note: Resistance of Discharge Resistar:
$RC_1 = RC_2 = 5\Omega$
$RC_3 = 1\Omega$
Charge Current Ic = 25A Obviously, numerous modifications and variations of the present invention are possible in light of the above teachings. It is therefore to be understood that, within the scope of the appended claims, the invention may be practiced otherwise than as specifically described herein.

What is claimed as new and is desired to be secure by Letters Patent of the United States is:

1. An electric double layer capacitor apparatus which is configured to supply electric power to an external electric load, comprising:
   a plurality of electric double layer capacitors connected in series;
   at least one set of a voltage detection device and a discharge device, the at least one set being provided to at least one of the plurality of electric double layer capacitors, the voltage detection device being configured to detect a terminal voltage of said at least one of the plurality of electric double layer capacitors;
   a controller configured to stop charging the plurality of electric double layer capacitors when said terminal voltage detected by the voltage detection device reaches a maximum charge voltage; and
   the discharge device being configured to discharge said at least one of the plurality of electric double layer capacitors within the electric double layer capacitor apparatus such that said terminal voltage drops toward a predetermined target voltage which is lower than the maximum charge voltage when said terminal voltage is higher than the predetermined target voltage, and the discharge device being configured not to discharge said at least one of the plurality of electric double layer capacitors when said terminal voltage is equal to or lower than the predetermined target voltage.

2. An electric double layer capacitor apparatus according to claim 1, wherein terminal voltages of the plurality of electric double layer capacitors are to be substantially equalized to said predetermined target voltage in a state.

3. An electric double layer capacitor apparatus according to claim 2, wherein the discharge device is configured to drop the terminal voltage of said at least one of the plurality of electric double layer capacitors after the plurality of electric double layer capacitors are charged.

4. An electric double layer capacitor apparatus according to claim 1, wherein the maximum charge voltage is set to be an equalized voltage to which terminal voltages of the plurality of electric double layer capacitors is to be substantially equalized in a state.

5. An electric double layer capacitor apparatus according to claim 4, wherein the discharge device is configured to drop the terminal voltage of said at least one of the plurality of electric double layer capacitors before the plurality of electric double layer capacitors are charged.

6. An electric double layer capacitor apparatus according to claim 5, wherein said predetermined target voltage is determined for each of the plurality of electric double layer capacitors such that said terminal voltages of the plurality of electric double layer capacitors substantially simultaneously become equal to the maximum charge voltage.

7. An electric double layer capacitor apparatus according to claim 6, wherein the controller is configured to start charging the plurality of electric double layer capacitors immediately after the discharge device discharges the plurality of electric double layer capacitors.

8. An electric double layer capacitor apparatus according to claim 6, wherein the controller is configured to stop charging based on an amount of charge supplied to the plurality of electric double layer capacitors.

9. An electric double layer capacitor apparatus according to claim 6, wherein the controller is configured to stop charging based on time elapsed from a starting point of charging the plurality of electric double layer capacitors.

10. An electric double layer capacitor apparatus according to claim 1, wherein the at least one set of the voltage detection device and the electric discharge device is provided to each of all of the plurality of electric double layer capacitors.

11. An electric double layer capacitor apparatus according to claim 1, wherein the at least one set of the voltage detection device and the electric discharge device is provided to a part of the plurality of electric double layer capacitors.

12. An electric double layer capacitor apparatus according to claim 1, wherein said set of the voltage detection device and the electric discharge device is connected to at least two capacitors among the plurality of electric double layer capacitors.

13. An electric double layer capacitor apparatus according to claim 1, wherein the controller comprises a switch which is configured to connect or disconnect the plurality of electric double layer capacitors and a power source.

14. An electric double layer capacitor apparatus according to claim 1, wherein the plurality of electric double layer capacitors are charged by supplying substantially constant current.

15. An electric double layer capacitor apparatus according to claim 1, wherein the discharge device comprises a resistor whose resistance is equal to or lower than 1 to 100 ($\Omega$) and through which said at least one of the plurality of electric double layer capacitors is discharged.

16. An electric double layer capacitor apparatus according to claim 1, wherein the voltage detection device comprises,
   a first detection portion which is configured to detect the maximum charge voltage, and
   a second detection portion which is configured to detect the predetermined target voltage.

17. An electric double layer capacitor apparatus according to claim 1, wherein a voltage range in which said terminal voltage of said at least one of the plurality of electric double layer capacitors is adjustable by the discharge device is from 50 (mV) to 900 (mV).

18. An electric double layer capacitor apparatus according to claim 1, wherein a number of the plurality of electric double layer capacitors is from 36 to 3025, and wherein discharge initial voltage of the electric double layer capacitor apparatus is at least 100 (V).

19. An electric double layer capacitor apparatus according to claim 1, wherein a number of the plurality of electric double layer capacitors is from 3 to 30, and wherein discharge initial voltage of the electric double layer capacitor apparatus is at most 50 (V).

20. An electric double layer capacitor apparatus according to claim 1, wherein relative dispersion of capacitances of the plurality of electric double layer capacitors is within ±20%.

21. An electric double layer capacitor apparatus according to claim 1, wherein charging current of the plurality of electric double layer capacitors is at least 10 (A).

22. An electric double layer capacitor apparatus according to claim 21, wherein charging current of the plurality of electric double layer capacitors is at least 25 (A).

23. An electric double layer capacitor apparatus according to claim 1, wherein the plurality of electric double layer capacitors are charged by supplying current which is changeable as time elapses.

24. An electric double layer capacitor apparatus according to claim 1, wherein the predetermined target voltage is determined for each of the plurality of electric double layer capacitors according to characteristics of each of the plurality of electric double layer capacitors.

25. A method for adjusting voltages of a plurality of electric double layer capacitors which are provided in an electric double layer capacitor apparatus and which are configured to supply electric power to an external electric load, comprising:

charging the plurality of electric double layer capacitors which are connected in series;

detecting a terminal voltage of at least one of the plurality of electric double layer capacitors;

stopping charging the plurality of electric double layer capacitors when it is determined that said terminal voltage is equal to or higher than a maximum charge voltage;

discharging electricity charged in said at least one of the plurality of electric double layer capacitors to a discharge device within the electric double layer capacitor apparatus such that said terminal voltage drops toward a predetermined target voltage which is lower than the maximum charge voltage when said terminal voltage is higher than the predetermined target voltage; and preventing discharging said at least one of the plurality of electric double layer capacitors such that said terminal voltage is maintained when said terminal voltage is equal to or lower than the predetermined target voltage.

26. A method according to claim 25, wherein the predetermined target voltage is set to be equal to an equalized voltage to which terminal voltages of the plurality of electric double layer capacitors is finally to be substantially equalized.

27. A method according to claim 25, wherein the maximum charge voltage is equal to an equalized voltage to which terminal voltages of the plurality of electric double layer capacitors is finally to be substantially equalized.

28. A voltage control circuit for an electric double layer capacitor apparatus which comprises a plurality of electric double layer capacitors connected in series and which is configured to supply electric power to an external electric load, comprising:

at least one voltage detection circuit configured to detect a terminal voltage of at least one of the plurality of electric double layer capacitors;

a controlling circuit configured to stop charging the plurality of electric double layer capacitors when it is determined that voltage of at least one of the plurality of electric double layer capacitors is equal to or higher than a maximum charge voltage based on the detected terminal voltage; and at least one electric discharging circuit provided corresponding to the at least one voltage detection circuit and for discharging electricity charged in adjustment capacitors among the plurality of electric double layer capacitors within the electric double layer capacitor apparatus such that voltage of each of the adjustment capacitors drops toward a predetermined target voltage which is lower than the maximum charge voltage when said terminal voltage is higher than the predetermined target voltage.

29. A system comprising:

a motor; and an electric layer capacitor apparatus comprising:

a plurality of electric double layer capacitors connected in series and configured to supply power to the motor;

at least one set of a voltage detection device and a discharge device, the at least one set being provided to at least one of the plurality of electric double layer capacitors, the voltage detection device being configured to detect a terminal voltage of said at least one of the plurality of electric double layer capacitors;

a controller configured to stop charging the plurality of electric double layer capacitors when said terminal voltage detected by the voltage detection device reaches a maximum charge voltage; and the discharge device being configured to discharge said at least one of the plurality of electric double layer capacitors within the electric double layer capacitor apparatus such that said terminal voltage drops toward a predetermined target voltage which is lower than the maximum charge voltage when said terminal voltage is higher than the predetermined target voltage, and the discharge device being configured not to discharge said at least one of the plurality of electric double layer capacitors when said terminal voltage is equal to or lower than the predetermined target voltage.

30. An electric double layer capacitor apparatus which is configured to supply electric power to an external electric load, comprising:

a plurality of electric double layer capacitors connected in series;

at least one set of voltage detection means for detecting a terminal voltage of said at least one of the plurality of electric double layer capacitors and discharge means for discharging said at least one of the plurality of electric double layer capacitors, the at least one set being provided to at least one of the plurality of electric double layer capacitors;

controller means for stopping current for charging the plurality of electric double layer capacitors when said terminal voltage detected by the voltage detection means reaches a maximum charge voltage; and the discharge means discharging said at least one of the plurality of electric double layer capacitors within the electric double layer capacitor apparatus such that said terminal voltage drops toward a predetermined target voltage which is lower than the maximum charge voltage when said terminal voltage is higher than the predetermined target voltage, and the discharge means not discharging said at least one of the plurality of electric double layer capacitors when said terminal voltage is equal to or lower than the predetermined target voltage.

31. A method according to claim 25, wherein the steps of claim 25 are controlled by a computer.

32. An electric double layer capacitor apparatus which is configured to supply electric power to an external electric load, comprising:

a plurality of electric double layer capacitors connected in series;

at least one voltage detection device configured to detect a terminal voltage of at least one of the plurality of electric double layer capacitors;

a controller configured to stop charging the plurality of electric double layer capacitors when said terminal voltage detected by the at least one, voltage detection device reaches a maximum charge voltage; and at least one discharge device configured to discharge said at least one of the plurality of electric double layer capacitors within the electric double layer capacitor apparatus such that said terminal voltage drops toward a predetermined target voltage which is lower than the maximum charge voltage when said terminal voltage is higher than the predetermined target voltage, and the discharge device being configured not to discharge said at least one of the plurality of electric double layer capacitors when said terminal voltage is equal to or lower than the predetermined target voltage.

33. An electric double layer capacitor apparatus according to claim 32, wherein the at least one voltage detection device comprises a plurality of voltage detection devices and the at least one discharge device comprises a plurality of discharge devices, and wherein a number of the plurality of voltage detection devices is different from a number of the plurality of discharge devices.

34. An electric double layer capacitor apparatus according to claim 33, wherein one of the at least one voltage detection device is configured to detect terminal voltages of two or more of the plurality of electric double layer capacitors, respectively.

* * * * *